June 10, 1969     J. SMITH     3,448,467
WASTE DISPOSAL SYSTEM
Filed April 13, 1967     Sheet 1 of 2
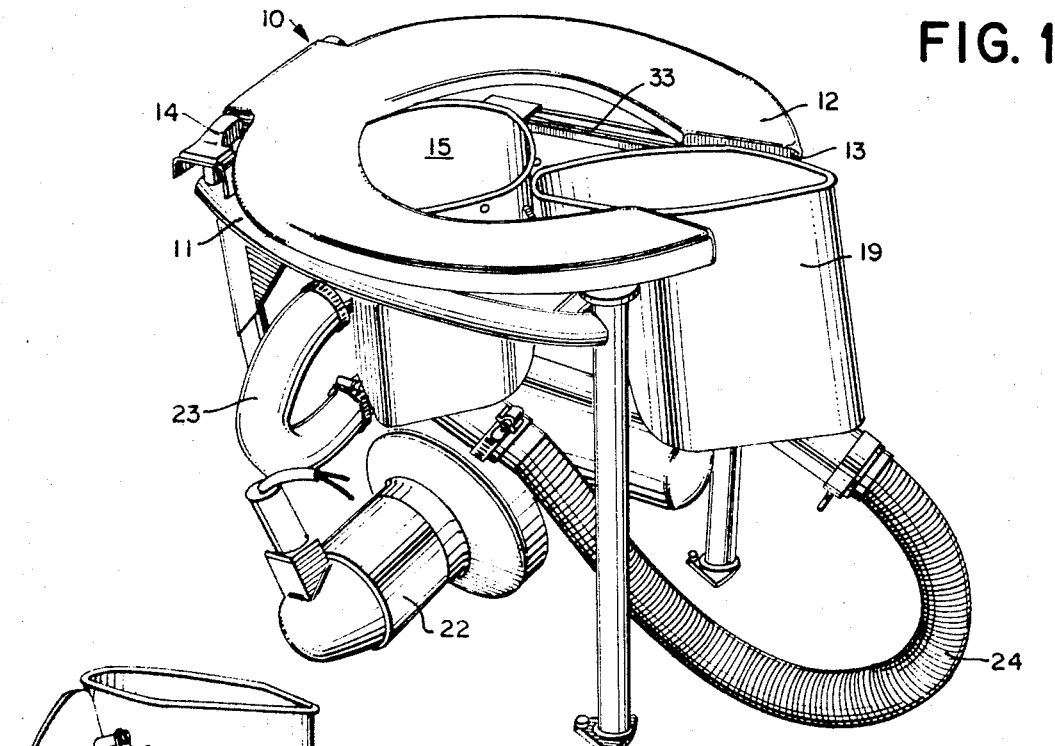
FIG. 1
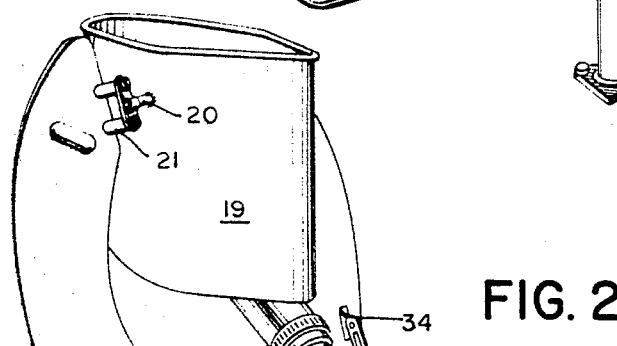
FIG. 2
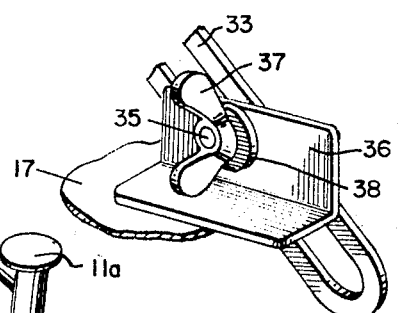
FIG. 3
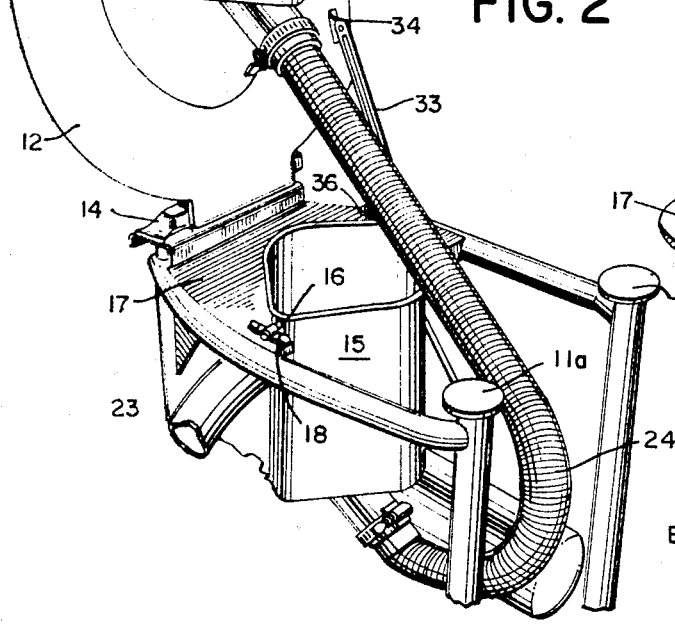
INVENTOR
JAMES SMITH
BY Darby & Darby
ATTORNEYS

INVENTOR
JAMES SMITH

United States Patent Office 3,448,467
Patented June 10, 1969

3,448,467
WASTE DISPOSAL SYSTEM
James Smith, West Sayville, N.Y., assignor to Fairchild Hiller Corporation, Bay Shore, N.Y., a corporation of New York
Filed Apr. 13, 1967, Ser. No. 630,730
Int. Cl. A47k 11/02; E03d 1/00, 3/00, 5/00
U.S. Cl. 4—120
8 Claims

ABSTRACT OF THE DISCLOSURE

A waste collection system with a toilet having a fecal collecting receptacle and a separate receptacle for urine waste pivotally mounted on the seat. The toilet seat is adjustable to any desired height and the urinal receptacle is freely pivotal to any angular position such as to easily collect urine at any height of the seat, thereby accommodating a user of any height. The system also has an exhaust pump which can be used in connection with both the urinal receptacle and fecal collecting receptacle so as to draw air therethrough and vapors and gases therefrom.

The present invention relates to a new and improved waste collection system for urine and fecal waste.

Background of the invention

With the accelerated development of space travel, new problems of disposal of human wastes have arisen for passengers or operators of space vehicles. These problems of waste collection, handling and disposal become especially acute on space missions of more than a few days with several occupants, such as is presently contemplated on protracted space missions of several months or years with as many as a dozen passengers of both sexes. Because of the large cumulative weights of human waste involved in these longer missions, several general techniques are presently planned for waste disposal. In such proposed techniques, for example, exhaled carbon dioxide is to be reconverted to oxygen, water is to be reclaimed from the air and wash water and urine and fecal waste reprocessed to reclaim the water therein for further use.

In present short duration space flights which operate under much less severe conditions than are soon to be imposed by long duration multi-passenger flights, the collection of human wastes still poses problems. In these short-duration flights waste collection currently is handled in a rudimentary manner in somewhat the same way as it is in a hospital bed. Here a plastic bag for collecting urine and a separate plastic bag having an adhesive-surrounded attachable opening for attachment to a support during use is normally employed. These bags are sealed after use. A disinfectant is added to each bag and they are sealed and stored until return to earth. While this technique can be tolerated on short flights, it is neither practical nor environmentally safe during longer distance space travel, since solid wastes in particular provide an ideal growth media for a number of microorganisms, many of which are potentially dangerous to the space vehicle occupants.

In addition to the problem of waste disposal of urine and fecal waste and recovery of reusable water, an additional disadvantage exists with the present means of waste collection outlined above. Frequently, during collection of urine during elimination thereof by one of the space travellers, an uncontrolled dispersal or spattering of urine about the urine collecting receptacle takes place. This occurs since the cabins of the space vehicle are normally free of gravity and urine must be deposited as proximally as possible to the mouth of the urine collecting receptacle under all conceivable positions assumed by the user. Using present collection bags, this is frequently not possible and urine is spattered about the collecting vessel creating discomfort and danger of contamination. Moreover, odors from fecal waste frequently escape to the cabin for the same reason and cause discomfort to occupants of the vehicle.

It is an advantage of the present waste collection system to provide means for collection and disposal of human waste products which obviates the above difficulties of the prior art and provides a means of waste collection which can be as easily and comfortably used by men as by women under all conditions of movement and environment where employed in a space vehicle.

The invention

The present invention provides a waste disposal system which is greatly improved in design and construction from the conventionally used crude means presently in use. The waste collection device of the present invention has the advantage of eliminating the prior need for using separate disconnected containers to collect solid and liquid waste. It provides for the first time a waste collection system capable of easy use when the toilet seat is in a horizontal position, a vertical position or various intermediate positions between these. It also has the advantage of safe and comfortable use under unusual environmental conditions where gravity may be lacking or external turbulence exists.

The present invention relates to a waste collection system in which the urine or fecal wastes are collected separately. In a preferred embodiment, the waste disposal device of the present invention incorporates a urine collecting feature which greatly improves the ease by which urine can be collected from male users. In accordance with the invention this urine collecting feature permits a male user to remain in a standing position and adjust the urine collecting receptacle to come to a proximate position with his organ by elevation of the toilet seat member to a desired height and then pivoting the receptacle to any desired angle. The advantageous nature of this adjustable urine collecting receptacle may be appreciated when it is realized that under reduced gravity conditions the existence of any appreciable distance between the urinary organ and the urine collector would permit the urine to spatter and also offset the slight vacuum created in the receptacle to direct the urine into the receptacle.

In use by male or female users in a sititng position, the urine collecting receptacle can assume an angular position, the exact angle of which is freely controllable by the user by simply pivoting the urine collecting receptacle on its axis to the position desired. In this manner of use it is obvious that the device would constitute an excellent means of urine specimen collection in hospitals or doctors' offices.

It is a principal object of the present invention therefore to improve the design, construction and operation of waste collection and disposal systems for collection of human waste.

A still further and more specific object of the invention is to provide a waste collection and disposal system which includes a urine collecting receptacle adapted for use by humans in either a standing or sitting position under varying condi.ions including those where normal gravity is lacking.

To the accomplishment of the foregoing and related objects, said invention then comprises the features hereinafter fully described and particularly pointed out in the several claims, the following description of construction and use and the annexed drawing setting forth in detail an illustrative embodiment of the invention. These descriptions and drawings are merely indicative, however, of but a few of the various ways in which the principles of the invention may be employed.

In the drawing:

FIG. 1 is a perspective view taken from the left front of the applicants' waste disposal system with the toilet seat member in a horizontal position as it would be used by one in a sitting position.

FIG. 2 is also a perspective view of the device with the seat in a vertical position.

FIG. 3 is a perspective view taken partly in section of one form of bracket for adjustably controlling the elevation of the toilet seat member and urine collecting receptacle.

Figure 4:
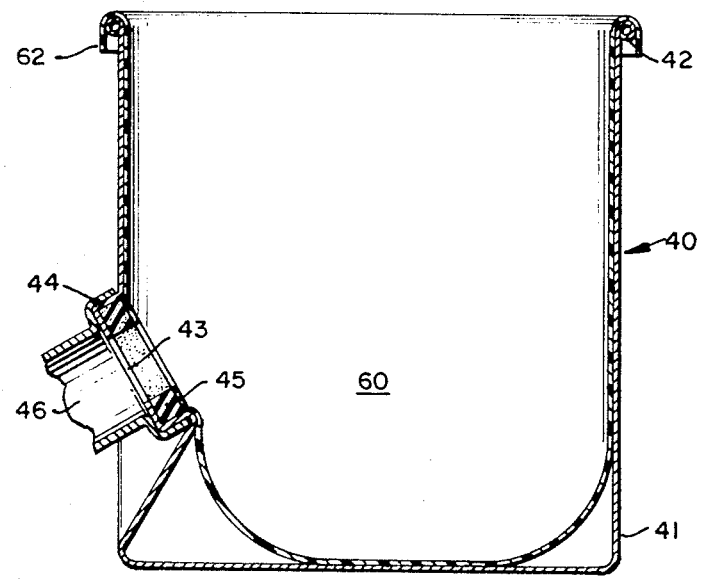
FIGS. 4 and 5 are cross-sectional views of two embodiments of waste receptacles with bags inserted therein.

Referring to FIGS. 1 through 3, the waste collection and disposal system 10 includes a chair-like tubular supportive frame 11 with a generally U shaped top. The frame 11 is preferably formed of aluminum, stainless steel or any other suitable material such as, plastic, etc. This frame is suitably fixed to a floor or base plate by bolts, screws or any other suitable fastener means fastened to flanges at the bottom of the tubular legs of this frame.

A conventional toilet seat 12 with an open front 13 is pivotally mounted by a hinge 14 at its rear to the frame. The front of the arms of the seat rest on two supports 11a at the front of the frame 11 when the seat is down. A generally oval shaped focal receptacle 15 is mounted to the top rail of the frame by a pair of pins 16 which rest on a backing plate 17 secured to the rear area of the frame. The backing plate is cut out to accept the receptacle 15. Each pin 16 is held by a bracket 18. While receptacle 15 is preferably fixedly mounted, for example by making the bottom of the pins 16 flat to prevent pivoting, it can be made to pivot if desired. One or both of the brackets 17 are made detachable so that the receptacle 15 can be removed for cleaning.

The urine collecting receptacle 19 which can be of the same general shape of receptacle 15 is pivotally attached to the front of the toilet seat 12 by a pair of pivot pins 20 inserted in a base 21 located underneath each of the front arms of the toilet seat. The pins 20 are welded or soldered to the receptacle 19 or fastened thereto by any other means. A portion of the receptacle 19 occupies the space between the front arms of the seat.

In operation as the toilet seat 12 is raised and lowered, urine receptacle 19 pivots on its pins 20 held within the base 21. This causes the urine collecting receptacle 19 to swing and assume an attitude wherein the mouth or opening thereof is always on the horizontal with respect to the floor. This is true whether the toilet seat member 12 is either totally or partially elevated. This permits users of the device to adjust it to their particular height and/or their particular position in the space craft at the time they need to use the facilities of the disposal device. By virtue of this, the free pathway of urine from the user to the receptacle is of course reduced and uncontrolled spattering of urine about the area of the collecting device is obviated.

An adjustable support is preferably provided so that the toilet seat can be held at an intermediate angle, such as at 45°, without the user touching the seat. One arrangement for doing this is shown in FIG. 3. Here the upper end of a slotted sliding arm 33 is connected to the bottom of the toilet seat 12 by a hinge 34. The slot of arm 33 rides on a bolt 35 which is threaded on one end and headed on the other (not shown) to prevent the arm 33 from becoming detached. The bolt 35 is held in a bracket 36 which is fastened to the backing plate 17. A wing nut 37 and washer 38 mounted on the bolt permit the arm 33, and thus the seat 12, to be held at any desired angle. This arrangement is highly advantageous when it is desired to adjust the urine collecting receptacle to the height of the particular male user and yet maintain the receptacle in proximate relation to the user. Of course, other similar arrangements can be used, for example, providing the arm 33 with a number of stops which rest on a fixed pin or a friction clutch device.

A guide plate 38 with an inclined outer edge is fastened to the fecal receptacle 15. The outer edge is located so as to engage the urine receptacle 19 when the seat is down to tip and hold the urine receptacle in the position shown in FIG. 1 with the portion of the receptacle 19 within the confines of the seat lower than the opposing portion. This properly positions receptacle 19 to receive urine when a male user is sitting on the seat and prevents the receptacle from tipping either forward or backward. The weight of receptacle 19 holds it against the guide.

The collecting receptacles both 15 and 19 can be formed of any suitable material such as porcelain, enamelware, durable plastic, or stainless steel. In use, a plastic bag is inserted in each of the receptacles 19 and 15 and attached to the lip of these receptacles.

Figure 5:
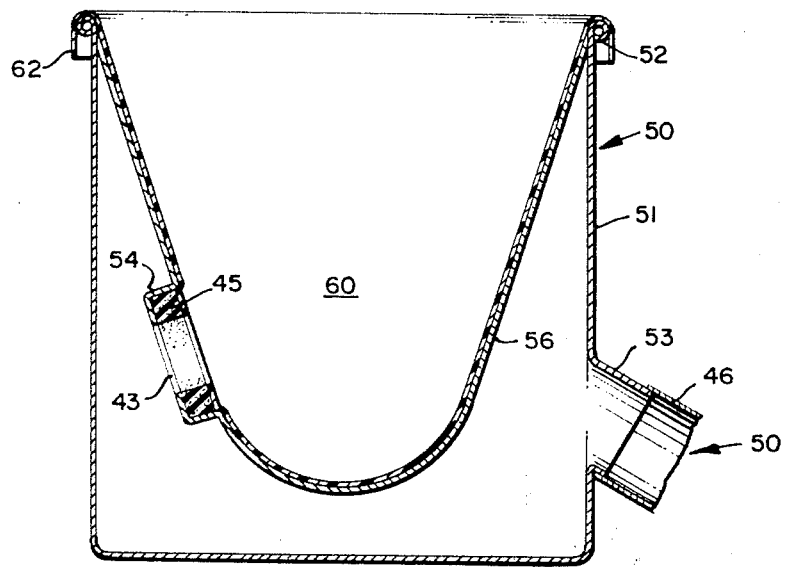

FIGS. 4 and 5 are cross-sectional views of two types of containers for use as the receptacles 15 and 19 and a waste collection bag inserted therein. The container 40 of FIG. 4 has a single wall 41 with a rolled upper edge 42. A hole 43 is located in the side wall of container 40 which is surrounded by a shoulder 44 which preferably has a washer, or O-ring, 45 sealed to the inside thereof. Washer 45 is of a soft material such as rubber. As explained below, the lip 44 and washer 45 forms a seal with the exhaust port of a waste collection bag 60. A fitting 46 for connection to a suction hose is fastened to the container wall around aperture 43.

In FIG. 5 container 50 has an outer wall 51 with a rolled upper edge 52. A suction hose fitting 46 is fastened to wall 51 around an aperture 53 therein. Wall 51 preferably is made of a durable material, such as metal. A second wall 56 is formed in the container for holding the waste collection bag. Wall 56 has a lip 54 with washer 45 fastened thereto to form a seal with the port of waste collection bag 60.

In both the embodiments of FIGS. 4 and 5, the waste collection bags have a continuous surrounding flap 62 which fits over the outer rolled edges 42 and 52 of the collector to effectively seal the upper opening of the container.

One type of bag which is preferably used with the subject invention is described in copending application Ser. No. 613,031 filed Jan. 31, 1967, entitled "Waste Collection Bags," which is assigned to the same assignee. The bags of that application also have a suitable closure at the topmost portion thereof of either a zipper or pressure sensitive tape. When ready for use, this closure is opened and the bags inserted into the receptacle and the flap 62 draped over the upper edge thereof and affixed thereto. After use, these bags are separated from their attachment to the receptacle and sealed and removed from the receptacle.

In the preferred embodiment of the invention, the collection bags 62 have an exhaust opening therein which may, if desired, contain a suitable filter (not shown). The exhaust openings are shown in the sides of bags 60 of FIGS. 4 and 5. These openings mate with the corresponding openings 43 in the bag supporting wall of each of the containers 40 and 50. A reduced pressure source provided by a vacuum pump 22 is connected to one or both receptacles 15 and 19. As shown in FIGS. 1 and 2, hoses 23 and 24 are respectively connected to the inlet fittings 46 of receptacles 15 and 19.

A seal is formed between the bag exhaust opening and the washer 45 as well as around the top of the container by the bag flap 62. Thus, operation of exhaust pump 22 causes the bags to expand and fill the space formed by the surrounding walls so that the bag and its contents are supported by the receptacle walls. Air flows inwardly through the top of each bag 60. This arrangement removes noxious and deleterious odors from the fecal receptacle 15. The passage of air into the urine container 19 also draws odors and vapors out through exhaust hose 24. In addition, it tends to direct urine into the receptacle and prevents splattering. This is extremely important in a zero gravity environment where droplets of urine would otherwise float if not properly collected.

In the container 40 of FIG. 4 the exhaust port of the bag is directly aligned with the container opening 43 and the low pressure source inlet fitting. In the container 50 of FIG. 5 the exhaust port of the bag and opening 43 on the inner wall 56 are shown diametrically spaced from the inlet fitting 46. Of course, the inlet fitting 46 can be located at any place in the outer wall in the configuration of FIG. 5 since the air flow will take place between the spaced inner and outer walls.

While in the aforesaid description of our novel waste collection system we have not particularly described the means for powdering the solid fecal waste, such means is not the subject matter of the present application. The same is true with respect to the vacuum pumps and other ancillary devices employed herein since these are conventional and known to those skilled in waste disposal. The present disclosure merely sets forth our preferred mode of operation of our novel waste collection system and undoubtedly many variations therein will become obvious to those versed in the art which variations are within the scope of our concept of invention.

What is claimed is:

1. A waste collection system comprising a toilet seat pivotally mounted on a base, a urine collecting receptacle having a top open mouth portion, and means for pivotally mounting said receptacle on said toilet seat so that the open mouth of the receptable assumes a substantially horizontal position for any relative position of the toilet seat.

2. A waste collection system according to claim 1, further comprising a receptacle for collection of fecal waste mounted on said base.

3. A waste collection system according to claim 1, further comprising means producing a reduced pressure for application to the interior of the urine collecting receptacle.

4. A waste collection system according to claim 2, further comprising means producing a reduced pressure for application to the interior of both the urine collecting receptacle and the receptacle for collection of fecal waste.

5. The waste collection system of claim 1, further comprising means connected to said toilet seat for positioning the same at a desired angle between the full open and closed positions.

6. A waste collection system comprising a waste collection receptacle having a waste collection opening and an exhaust opening, a waste collection bag having an open waste entrance portion with a surrounding flap and an exhaust port in a portion thereof, said bag located in said receptacle with its flap overlying the receptacle edge surrounding the waste collection opening of the receptacle and with its exhaust port generally adjacent the exhaust opening of the container, application of an exhaust gas source to said container at said exhaust opening drawing gas through the waste entrance of said bag through said exhaust port.

7. The system of claim 6 further comprising a means on the inside of the receptacle to form a seal between the receptacle and the bag exhaust port.

8. The system of claim 6 wherein said receptacle has spaced inner and outer walls, said inner wall supporting said bag and formed with an exhaust opening to communicate with the interior of the bag through its exhaust port, and said outer wall also having an opening therein through which connection can be made to an exhaust gas source.

References Cited

UNITED STATES PATENTS

| | | | |
|---|---|---|---|
| 248,444 | 10/1881 | Gafney | 4—138 |
| 796,804 | 8/1905 | Burke | 4—120 |
| 1,309,742 | 7/1919 | Moore | 4—120 |
| 1,676,116 | 7/1928 | Smith | 4—10 |
| 2,294,349 | 8/1942 | Muller | 4—237 |
| 2,687,535 | 8/1954 | Almorth | 4—239 |

LAVERNE D. GEIGER, *Primary Examiner.*

H. K. ARTIS, *Assistant Examiner.*

U.S. Cl. X.R.

4—10, 142